United States Patent [19]

Nadler

[11] 4,163,213

[45] Jul. 31, 1979

[54] ALPHANUMERIC CHARACTER IDENTIFICATION

[75] Inventor: Morton Nadler, Le Celle Saint-Cloud, France

[73] Assignee: Norprint Limited, England

[21] Appl. No.: 847,894

[22] Filed: Nov. 2, 1977

[30] Foreign Application Priority Data

Nov. 4, 1976 [GB] United Kingdom ............... 45872/76

[51] Int. Cl.² ............................................... G06K 9/00
[52] U.S. Cl. .................... 340/146.3 D; 340/146.3 AC
[58] Field of Search .............. 340/146.3 D, 146.3 AC, 340/146.3 J, 146.3 AE, 146.3 SG

[56] References Cited

U.S. PATENT DOCUMENTS

| | | | |
|---|---|---|---|
| 3,178,688 | 4/1965 | Hill et al. | 340/146.3 AC |
| 3,290,650 | 12/1966 | Bailey et al. | 340/146.3 J |
| 3,503,043 | 3/1970 | Brass | 340/146.3 D |
| 3,541,511 | 11/1970 | Genchi et al. | 340/146.3 AC |
| 3,992,697 | 11/1976 | Knab et al. | 340/146.3 AC |

Primary Examiner—Joseph M. Thesz

Attorney, Agent, or Firm—Leydig, Voit, Osann, Mayer & Holt, Ltd.

[57] ABSTRACT

The method and apparatus disclosed involve the scanning of a representation of a character by means of at least three frame scans based on respectively different directions, the frame scans developing quasitopological codes (QTC) indicative of character STARTS, OPENINGS, CLOSINGS and FINISHES. The QTC relating to convexity-shapes and concavity-shapes of different segments of the character are then automatically stored in respective groups of storage locations in a store, such that, at the end of the process, the groups storing QTC are functionally arranged approximately in the shape of the character so that the character is at least partially recognizable thereby. Also disclosed is method and apparatus in which at least partial recognition of the character takes place by comparing the distances between selected pairs of QTC. In addition, the recognition process may involve the actual comparison of the list of QTC for the character with a set of lists representing predetermined characters.

19 Claims, 55 Drawing Figures

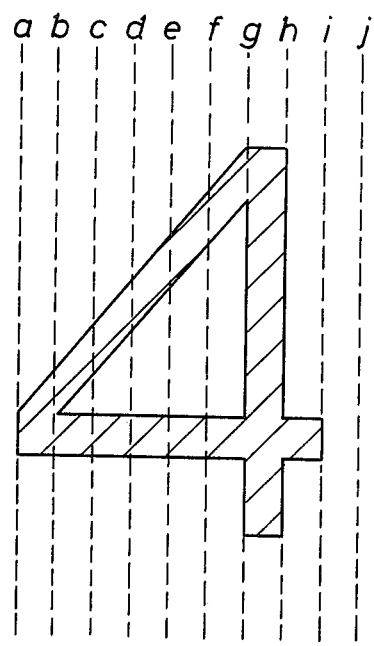
FIG./.
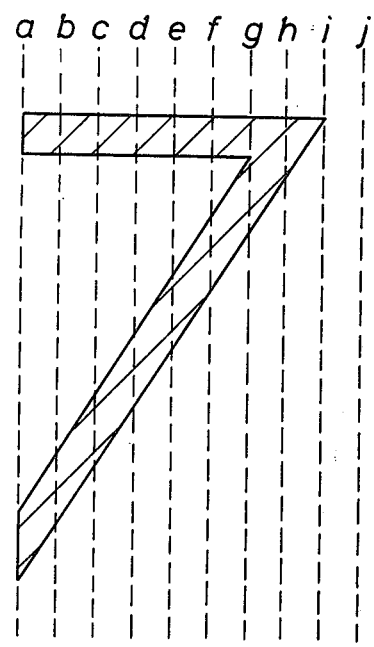
FIG.3.
FIG.2a.
FIG.2b.
FIG.2c.
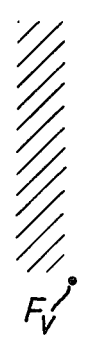
FIG.2d.

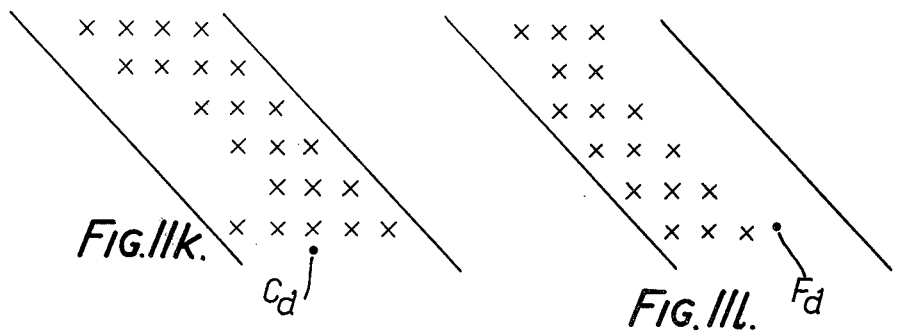
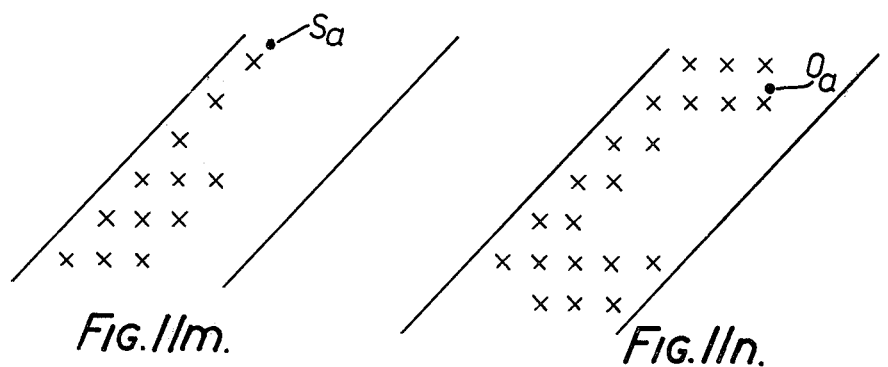
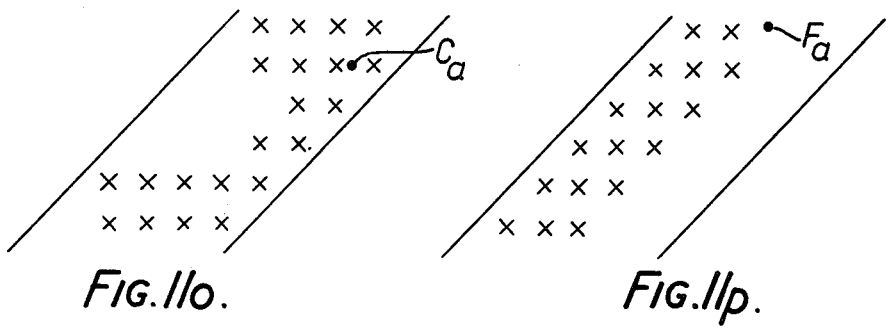
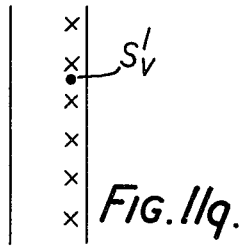

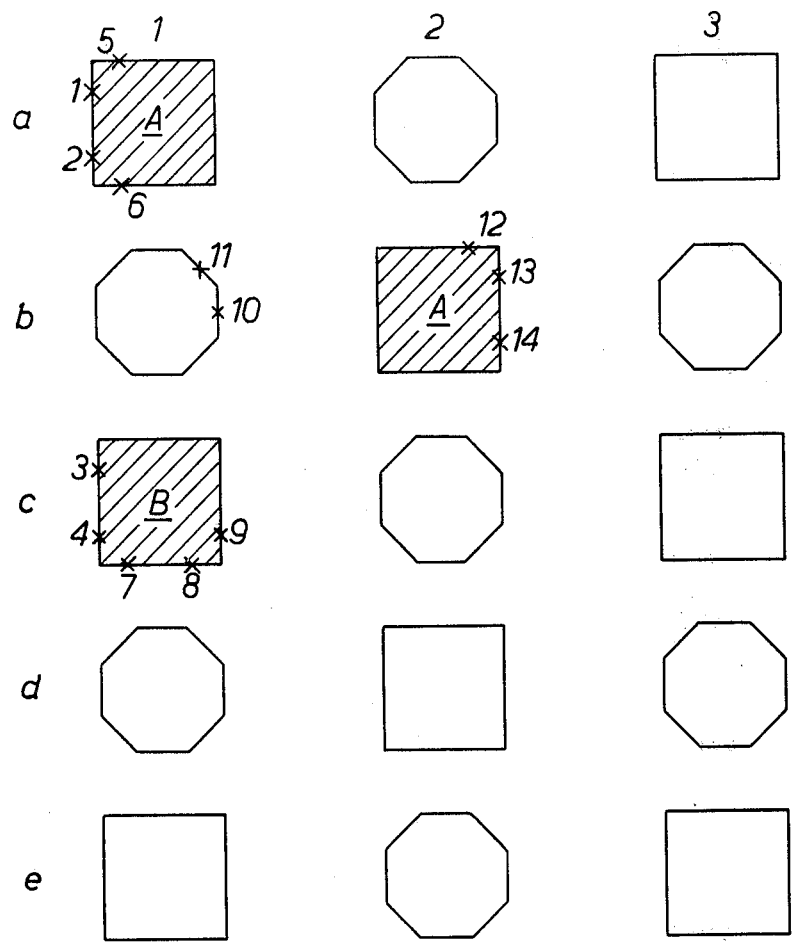
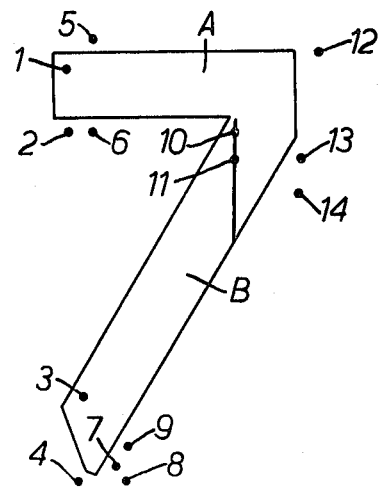
FIG. 21.

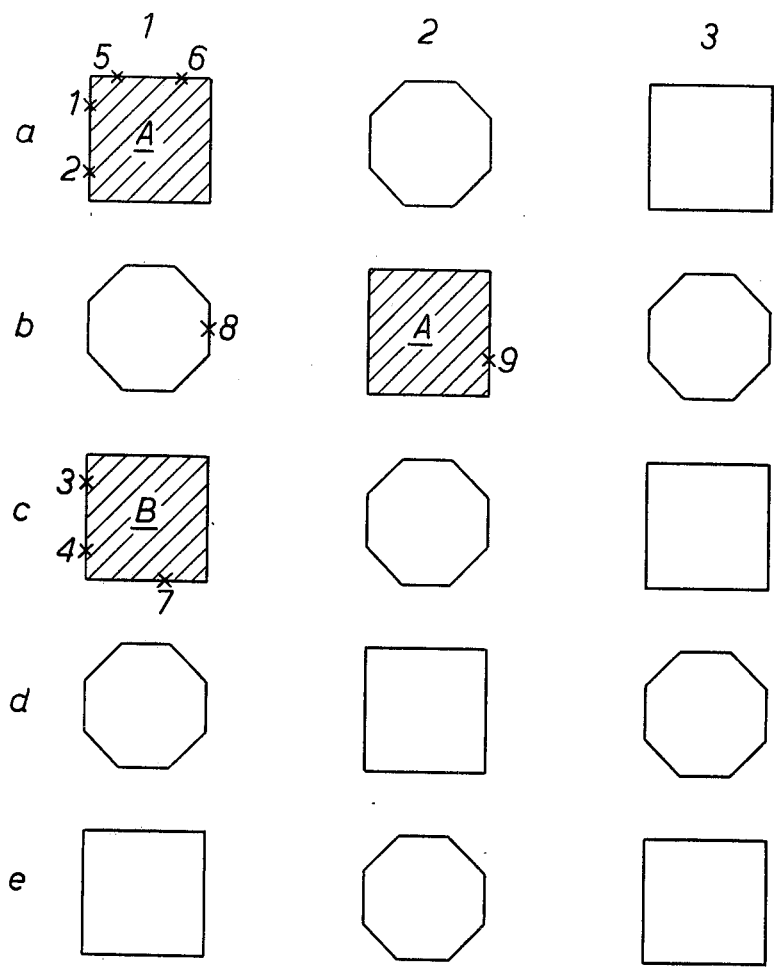
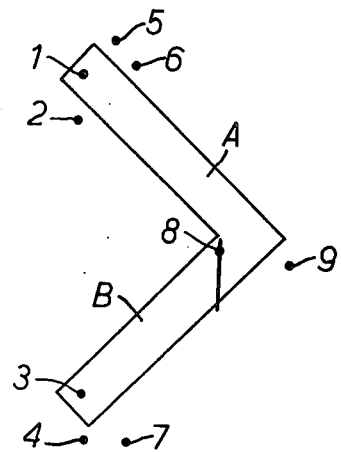
FIG.22.

ALPHANUMERIC CHARACTER IDENTIFICATION

BACKGROUND OF THE INVENTION

The invention relates to apparatus and methods for automatic identification or reading of symbols such as alphanumeric characters.

BRIEF SUMMARY OF THE INVENTION

According to the invention, there is provided a method of character identification, in which a predetermined area carrying a representation of the character to be identified is subjected to a plurality of frame scans, the scans comprising at least three scans of respectively different directions, each scan involving the detection whether or not each element of the said area includes part of the character representation whereby each scan develops no code or one or more of the following codes in dependence on the shape of the character representation, namely codes respectively representing a START, a FINISH, an OPENING and a CLOSING of the character representation, monitoring the said codes to divide the character representation into segments thereof each of which at least partially embraces a concavity thereof, storing those codes of each segment which relate to convexity-shapes in a part of storage means which is respective to that segment, and initiating an identification process by comparing the functional positions in the storage means of the parts of the storage means storing the said codes.

According to the invention, there is further provided a method of identifying characters by their shapes, comprising the steps of carrying out a plurality of frame scans across an area on which is presented a representation of the character so as to distinguish between elements of the area which include a part of the character representation and elements thereof which do not, the frame scans being based on at least three respectively different directions, whereby to produce from each scan, and in dependence on the shape of the character representation, no code or one or more than one of the following codes, namely, codes respectively representing a START, a FINISH, an OPENING, and a CLOSING of the character representation or part thereof, and comparing the distances between selected pairs of the said codes relating to a character representation whereby at least partially to identify that character.

According to the invention, there is also provided a method of identifying characters by their shapes, comprising the steps of carrying out a plurality of frame scans across an area on which is presented a representation of the character so as to distinguish between elements of the area which include a part of the character representation and elements thereof which do not, the frame scans being based on respectively different directions two of which directions are perpendicular to each other and two more of which are oblique to the first two and perpendicular to each other whereby to produce from each scan, and in dependence on the shape of the character representation, no code or one or more than one of the following codes, namely, codes respectively representing a START, a FINISH, an OPENING, and a CLOSING of the character representation thereof, monitoring the said codes to divide the character representation into segments thereof each of which at least partially embraces a concavity thereof, storing those codes of each segment which relate to convexity-shapes in a part of storage means which is respective to that segment, storing those codes of each segment which relate to concavity-shapes in a part of the storage means which is respective to that segment and different from the said part which is respective to the same segment and is for storing those codes relating to convexity-shapes thereof, carrying out a character identification process by comparing the functional positions in the storage means of the parts thereof storing the said codes, carrying out another character identification process by comparing the distances between pairs of the said codes relating to a character representation, and using the results of the two character identification processes to at least partially identify the character.

According to the invention, there is still further provided apparatus for character identification, comprising means defining an area for receiving a representation of the character to be identified, means for subjecting the area to a plurality of frame scans, the scans comprising at least three scans of respectively different directions, detecting means operative during each scan to detect whether or not each element of the said area includes part of the character representation whereby each scan develops no code or one or more of the following codes in dependence on the shape of the character representation, namely codes respectively representing a START, a FINISH, an OPENING and a CLOSING of the character representation, means for monitoring the said codes to divide the character representation into segments thereof each of which at least partially embraces a concavity thereof, code storage means, means for storing those codes of each segment which relate to convexity-shapes in a part of the storage means which is respective to that segment and means for comparing the functional positions in the storage means of the parts of the storage means storing the codes whereby at least partially to identify the character.

According to the invention, there is yet further provided apparatus for identifying characters by their shapes, comprising means for defining an area for receiving a representation of the character to be identified, means for carrying out a plurality of frame scans across the area so as to distinguish between elements of the area which include a part of the character representation and elements thereof which do not, the frame scans being based on at least three respectively different directions whereby to produce from each scan, and in dependence on the shape of the character representation, no code or one or more than one of the following codes, namely, codes respectively representing a START, a FINISH, an OPENING, and a CLOSING of the character representation or part thereof, and comparing means for comparing the distances between pairs of the said codes relating to a character representation whereby at least partially to identify that character.

DESCRIPTION OF THE DRAWINGS

Automatic character identification apparatus embodying the invention, and methods according to the invention of automatically identifying characters, will now be described, by way of example only, with reference to the accompanying diagrammatic drawings in which:

FIG. 1 is a diagram showing a scanning technique used in the apparatus and method;

FIGS. 2a to 2d are diagrams explaining the operation of the technique of FIG. 1;

FIG. 3 is a diagram showing the scanning technique of FIG. 1 applied to a different character;

FIG. 21 illustrates how the numeral "7" is stored in the memory of FIG. 15;

FIGS. 22 and 23 correspond to FIG. 21 and show how other characters are stored in the memory of FIG. 15;

DESCRIPTION OF PREFERRED EMBODIMENTS

The apparatus to be described recognizes characters with the use of quasitopological codes (QTC), that is, codes which respectively convey information relating to the shape of different characters—and of course are intended to convey such information as will enable the characters to be distinguished from each other.

By way of example, FIG. 1 illustrates possible QTC's for a numeral "4". If the numeral is subjected to a succession of scans along respective vertical lines a to j, each scan progressing downwards along the respective line, then the start of the character will be detected by the scan along line a, the opening of a concavity in the character will be detected by the scan along line c, the closing of the concavity will be detected by the scan along line g, and the finish of the character will be detected by the scan along line j. Representing these incidents by "S" ("Start"), "O" ("Opening"), "C" ("Closing"), and "F" ("Finish"), the overall QTC for the character 4 can be stated as "SOCF".

Before subjecting further characters to the same technique, it is necessary to define some of the terms more rigorously, and FIGS. 2a, 2b, 2c, and 2d show the character shapes which may be respectively detected as "Start", "Opening", "Closing", and "Finish", these codes being respectively denoted by $S_v$, $O_v$, $C_v$, and $F_v$ (the subscript v being added to indicate that the scan used is a vertical scan). The approximate points where the respective codes are detected are indicated by the arrowed points. Therefore, applying the new notation and the definitions of FIGS. 2a to 2d to the numeral "4" of FIG. 1, the overall QTC for the numeral "4" is "$S_v$ $O_v$ $C_v$ $F_v$".

FIG. 3 shows the numeral "7" subjected to the same scanning process. Applying the definitions of FIGS. 2a to 2d to the numeral "7" as shown in FIG. 3, two Starts will be detected by the scan along line a, a Closing will be detected by the scan along line g, and a Finish will be detected by the scan along ling j. The QTC for the numeral "7" is therefore "$S_v$ $S_v$ $C_v$ $F_v$".

From the foregoing it is apparent that the QTC for the numeral "7" is different from the QTC for the numeral "4", and this enables the two numerals to be distinguished.

The method briefly described with reference to FIGS. 1 to 3 could be implemented using, for example, a vertically arranged column of photocells and moving it in a horizontal direction across each character to be recognised. With suitable logic, it will be apparent that the codes $S_v$, $O_v$, $C_v$ and $F_v$ could be readily recognised.

Figure 4:
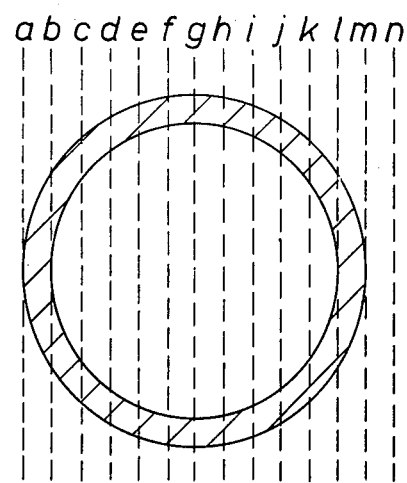
FIG. 4 is a diagram showing the scanning technique of FIG. 1 applied to a further character.

FIG. 4 shows the numeral "0" subjected to the same technique as in FIGS. 1 and 3.

Applying the definitions of FIGS. 2a to 2d to FIG. 4, it will be apparent that the code $S_v$ will be detected by the scan along line a, $O_v$ by the scan along line c, $C_v$ by the scan along line 1, and $F_v$ by the scan along line n. Thus the QTC for the numeral "0" is "$S_v$ $O_v$ $C_v$ $F_v$"—and is therefore indistinguishable from the QTC for the numeral "4".

The technique as so far described is thus not satisfactory for uniquely distinguishing certain numerals, and will of course be still less satisfactory if hand written numerals are to be distinguished.

Figure 5:
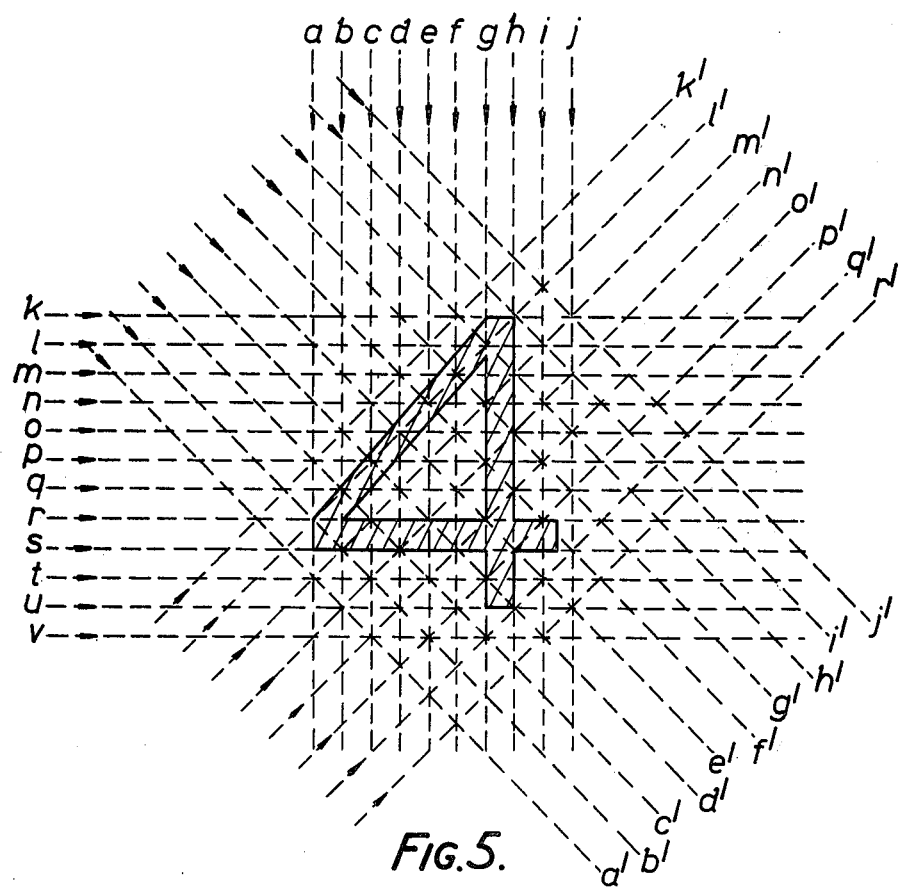
FIG. 5 is a diagram showing a modified form of the scanning technique of FIG. 1.
Figure 6A:
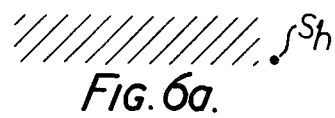
FIGS. 6a to 6d, 7a to 7d and 8a to 8d are diagrams explaining the operation of the scanning technique of FIG. 5.
Figure 6B:
Figure 6C:
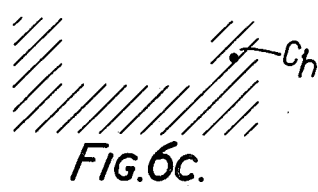
Figure 6D:
Figure 7A:
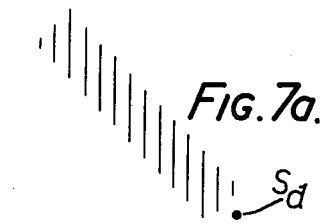
Figure 7B:
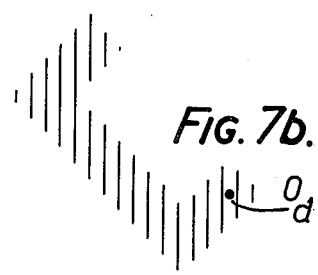
Figure 7C:
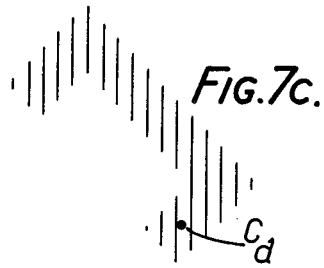
Figure 7D:
Figure 8A:
Figure 8B:
Figure 8C:
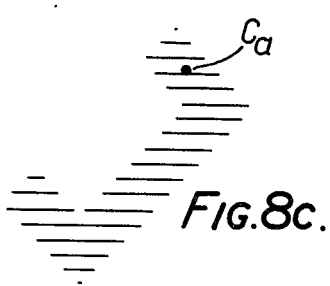
Figure 8D:
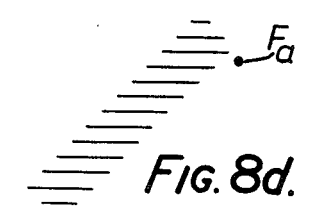

FIG. 5 shows a modified form of the scanning technique so far described.

In FIG. 5, there is shown a numeral "4" which is subjected to a vertical scan along lines a to j, a horizontal scan along lines k to v, an oblique-descending scan along lines a' to j' and an oblique-ascending scan along lines k' to r'. The arrows indicate the directions of scanning. As before, the Starts, Openings, Closings and Finishes of the character, as detected by the scans along the various lines, are recorded.

FIGS. 6a, 6b, 6c and 6d respectively define the character shapes which are recognised as Starts ("$S_h$"), Openings ("$O_h$"), Closings ("$C_h$"), and Finishes ("$F_h$") for the horizontal scans. Similarly, FIGS. 7a, 7b, 7c and 7d define the character shapes which are recognised as Starts ("$S_d$"), Openings ("$O_d$"), Closings ("$C_d$") and Finishes ("$F_d$") for the oblique-descending scan and FIGS. 8a to 8d define the character shapes which are recognised as Starts ("$S_a$"), Openings ("$O_a$"), Closings ("$C_a$"), and Finishes ("$F_a$") for the oblique-ascending scans.

Applying the definition of FIGS. 2a to 2d, 6a to 6d, 7a to 7d, and 8a to 8d to the numeral "4" as shown in FIG. 5, it will be apparent that the codes detected are as follows:

TABLE 1

| Scanning Line | QTC detected |
| --- | --- |
| a | $S_v$ |
| c | $O_v$ |
| g | $C_v$ |
| j | $F_v$ |
| k | $S_h$ |
| m | $O_h$ |
| r | $C_h$ |
| v | $F_h$ |
| b' | $S_d$ |
| c' | $O_d$ |
| e' | $C_d$ |
| f' | $O_d$ |

TABLE 1-continued

| Scanning Line | QTC detected |
| --- | --- |
| h' | $C_d$ |
| j' | $F_d$ |
| l' | $S_a$ |
| m' | $O_a$ |
| o' | $C_a$ |
| q' | $O_a$ |
| v' | $F_a$ |

It is apparent from the Table above that the extended scanning technique enables the numeral "4" to be distinguished from the numeral "0" because the more extended scanning technique enables both the lower concavity of the numeral "4" and the concavities produced by the "tail" of the "4" to be recognized; none of these could be recognized by the simple vertical scanning of FIG. 1.

The manner in which a scanning technique such as described with reference to FIG. 5 may be implemented will now be described in greater detail.

Figure 9:
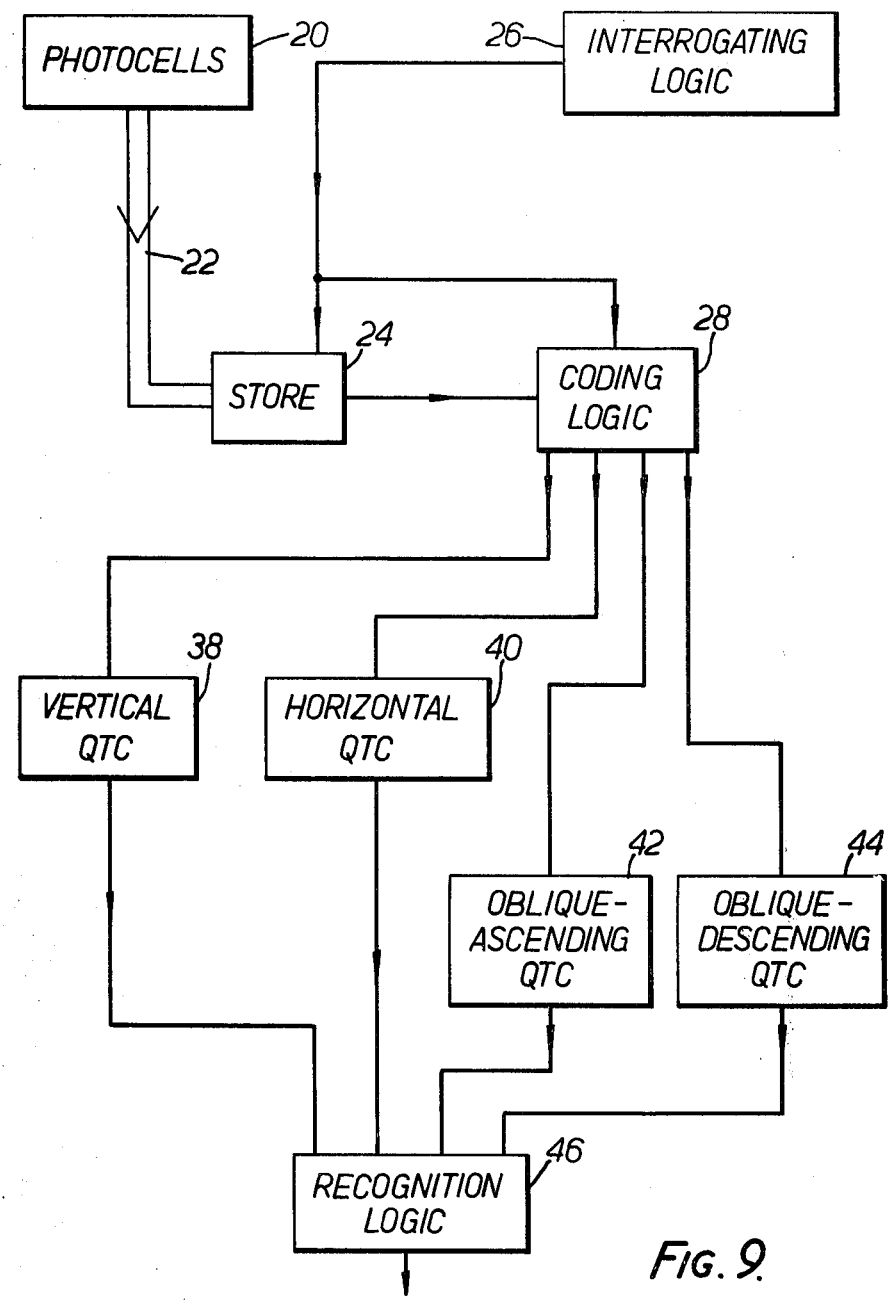
FIG. 9 is a block diagram of apparatus for carrying out the technique of FIG. 5.

As briefly mentioned above, the scanning technique may be carried out by an array of photocells which may be arranged in side-by-side columns (the term "column" being intended to mean a line of photocells arranged in an upright sense with respect to the normal orientation of a character to be read). The photocells can be mounted in a reading head which can be arranged to be moved in a horizontal direction (that is, perpendicularly to the defined direction of the columns) with respect to the character being read. At this movement continues, the photocell outputs (that is "black" or "white" according to whether the photocells detect the presence or absence of a character portion) can be transferred to a store which, at the end of the scanning process, therefore stores an image of the character in terms of "black" and "white" photocell outputs in a store which can be considered functionally to have a matrix of columns and rows of storage locations. These storage locations may then be interrogated sequentially in such order as to carry out the vertical, horizontal, oblique-ascending and oblique-descending scans referred to above, and the stores outputs can then be processed in order to output the Start, Opening, Closing and Finish codes. Such apparatus is shown in block diagram form in FIG. 9. A more sophisticated technique is discussed in an article by the present inventor, entitled "Sequentially-Local Picture Operators" and published in the proceedings of the Second International Joint Pattern Recognition Conference, Copenhagen, 1974.

Figure 10:
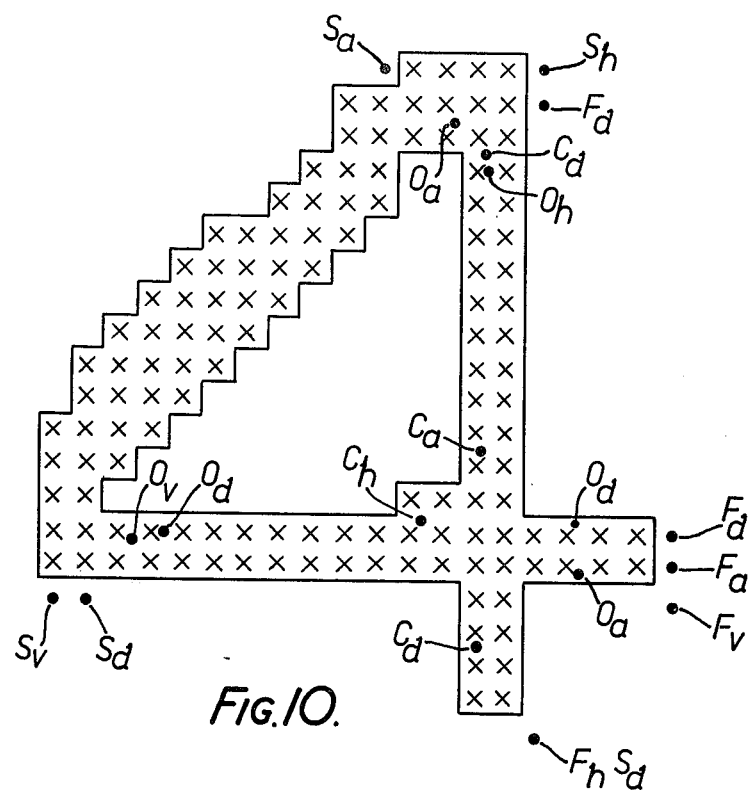
FIG. 10 is a diagrammatic representation of information which may be stored in the apparatus of FIG. 9.

As shown, the array of phototcells 20 is connected by a data channel 22 to a data store 24. As the array of photocells is moved horizontally across the character, the photocell outputs are fed into corresponding locations in a store 22 by means of a data highway 24. Therefore, at the end of the traverse of the photocell array across the character, the contents of the store 22 may be as shown diagrammatically in FIG. 10 where it is assumed that a numeral "4" has been read. In FIG. 10, detection of part of a character by a photocell is indicated by a "X", while detection by a photocell of absence of a character part is indicated by a blank. In FIG. 10, to aid recognition of the character, an outline has been drawn around the stored photocell outputs.

By means of suitable logic 26, the storage locations may then be interrogated in suitable sequences so as to carry out the vertical, horizontal, oblique-ascending and oblique-descending scans described with reference to FIG. 5. As the storage locations are scanned, the outputs are fed to coding logic 28, which is also controlled by the interrogation logic 26, and the logic 28 produces the Start, Opening, Closing and Finish codes on lines 30, 32, 34 and 36 for the vertical, horizontal, oblique-ascending and oblique-descending scans respectively. The codes may be stored in buffers 38, 40, 42 and 44 and then applied to character recognition logic 46 which analyses the combination of QTC's presented to it, in accordance with a predetermined algorithm, and recognises the character.

The operations carried out by the coding logic 28 will now be considered in greater detail.

Figure 11A:
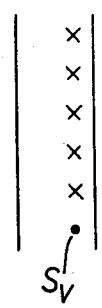
FIGS. 11a to 11q are diagrams for explaining the operation of the apparatus of FIG. 9 in more detail.
Figure 11B:
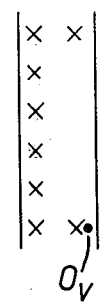
Figure 11C:
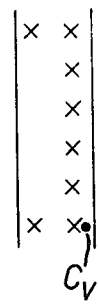
Figure 11D:
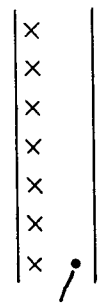
Figure 11E:
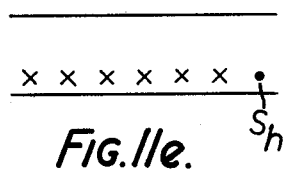
Figure 11F:
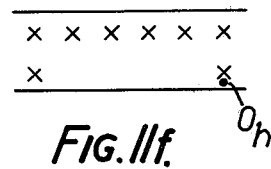
Figure 11G:
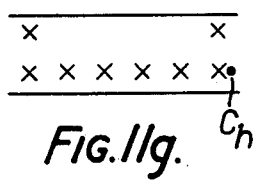
Figure 11H:
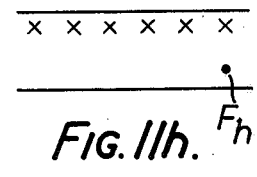
Figure 11I:
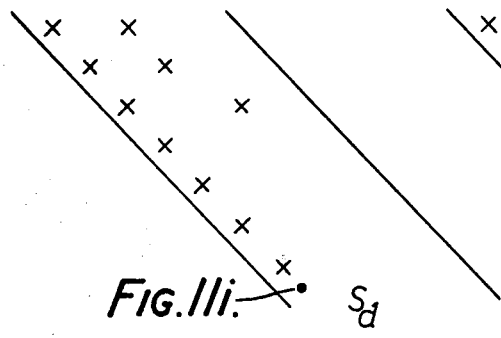
Figure 11J:
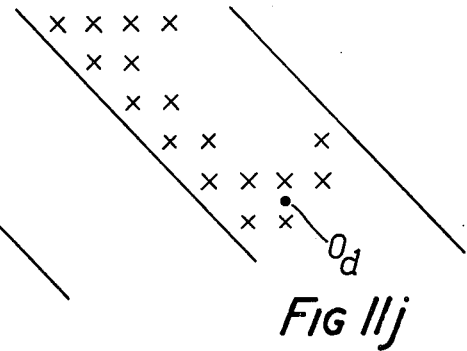

FIGS. 11a to 11p show the character contours of FIGS. 2a to 2d, 6a to 6d, 7a to 7d and 8a to 8d redrawn in terms of photocell outputs and define the particular patterns of photocell outputs which are recognised as corresponding to the codes $S_v$, $O_v$, $C_v$ and $F_v$, and the corresponding codes for the horizontal, oblique-descending and oblique-ascending scans.

As before, the dot in each figure indicates the point where the respective QTC is actually detected.

FIG. 11q shows how an extra code, $S'_v$, is defined. The purpose of this code will be explained in detail below. Briefly, however, it indicates the possible sensing of a new stroke of a character—but the code does not become effective (that is, it is not taken to indicate a new character stroke) until it is confirmed by a following code $S_v$.

For detecting the QTC for the vertical and horizontal scans, the stored photocell outputs are interrogated in pairs. That is, in the case of the vertical scans, the adjacent storage locations in two side-by-side columns are interrogated simultaneously; the next two storage locations immediately below those two are then interrogated; and so on to the bottom of the columns. The scanning process then shifts one column to the right and repeats. For the horizontal scans, two adjacent storage locations respectively in two adjacent rows are first interrogated; the next two storage locations on the right are then interrogated; and so on, to the end of those rows. The scan is then shifted by one row and the process repeats. To reduce the effect of noise, it is advantageous to use a more elaborate scanning process in which three scanning locations are simultaneously scanned.

In the case of the oblique scans, it is necessary to scan the storage locations in five columns simultaneously in order to avoid ambiguity, though of course as each scan proceeds the five columns whose storage locations are inspected change, shifting one column to the right for each step of the scan in order to provide the oblique inclination of the scan.

The system is automatically reset at the end of each scanning line.

Figure 12:
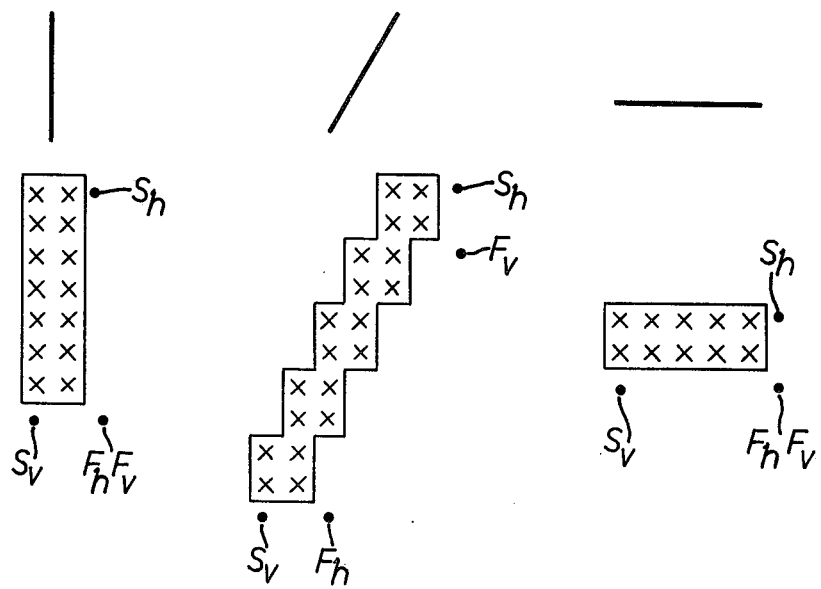
FIGS. 12, 13 and 14 are diagrams showing the scanning technique of FIG. 5 applied to certain characters.

The foregoing indicates how the use of the four scans, vertical, horizontal, oblique-descending and oblique-ascending, enables a number of characters to be separately recognised. However ambiguities can still arise, particularly in the case of hand-written or badly printed characters. For example, FIG. 12 indicates a simple form of ambiguity which can arise and shows the characters "1" (a hand-written 1 without a bar), a "/" and a "-". Shown below these characters in enlarged form are the corresponding images as detected by the photocell array and stored in the store 24, the outlines being drawn in to aid explanation. Also inscribed in FIG. 12 are the QTC. It will be apparent that the QTC for these three characters are identical and cannot therefore be used to distinguish the characters.

Figure 13:
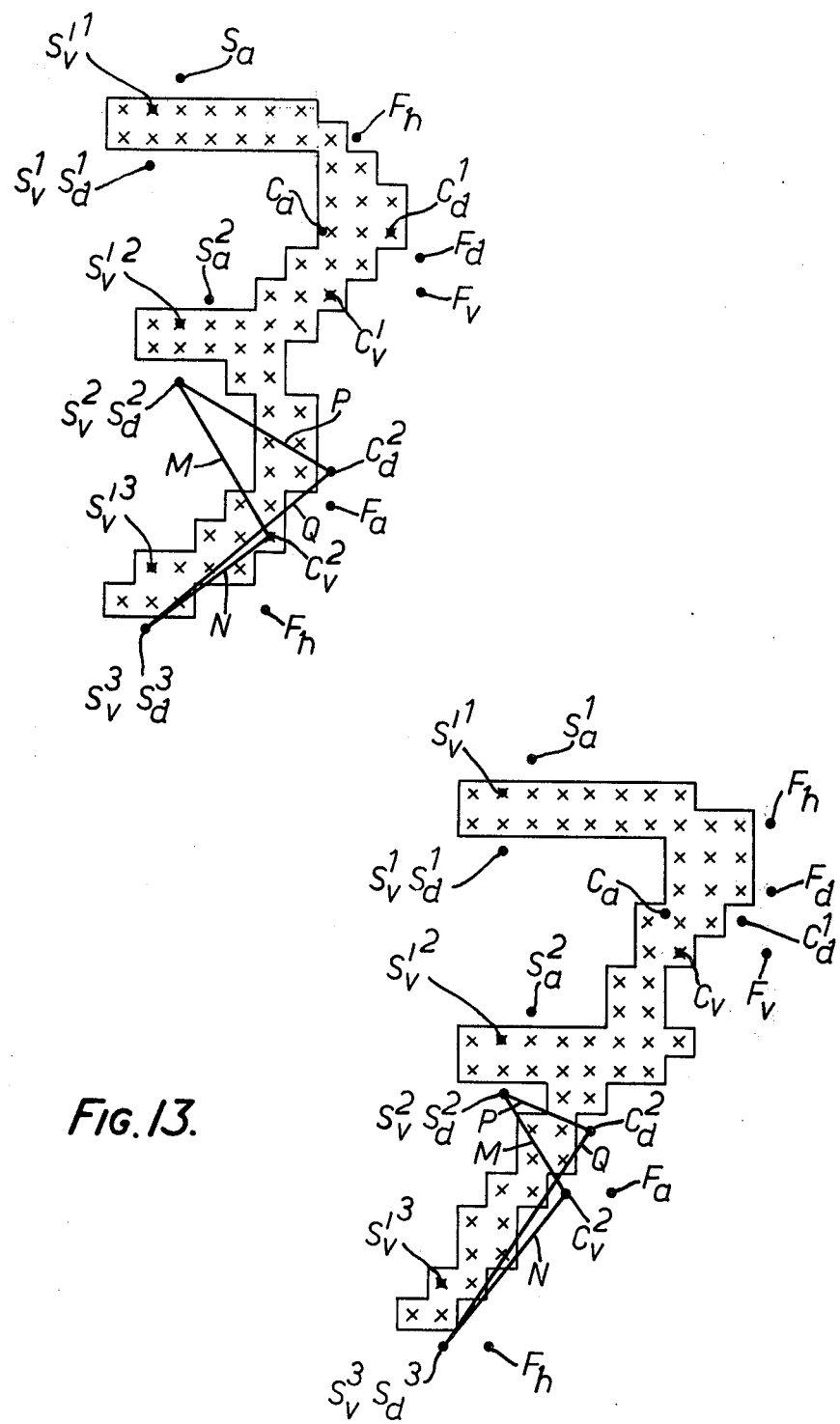

In another example, FIG. 13 shows two hand-written numerals, "3" and "7" (the latter being a "7" written in the continental manner with a horizontal bar). Below the numerals are shown their resultant images as stored in the store 24 after scanning by the photocell array, the solid outline being drawn in to aid explanation. Also shown in FIG. 13 are the points where the various QTC are detected. The superscript numerals applied to the QTC are intended to correlate each QTC with a particular segment of the character in a manner which will be described in more detail later. Analysis of the QTC for the two numerals shows that they are identical, and could not therefore be used to distinguish between the two numerals.

Figure 14:
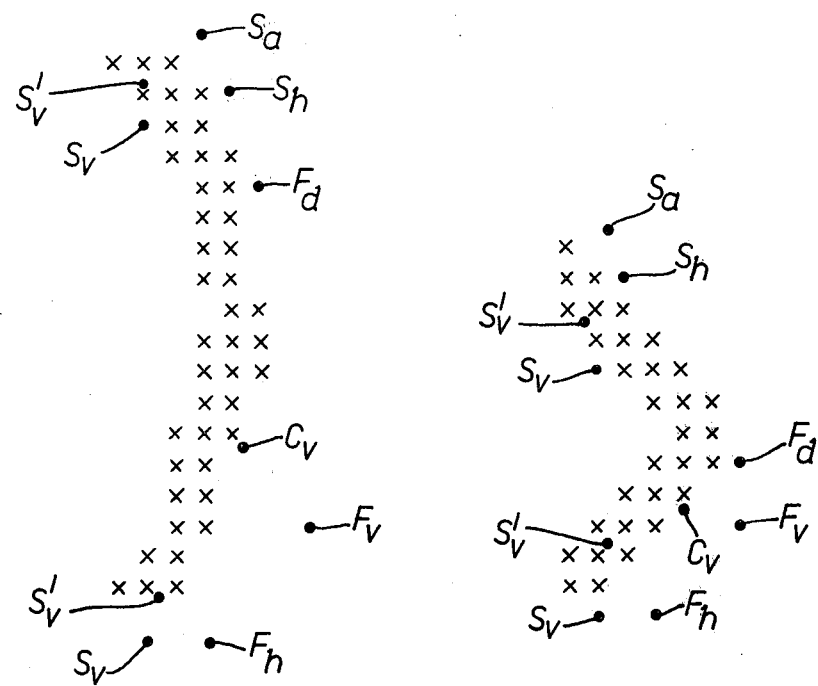

A further example is shown in FIG. 14. Here the two characters are the sign for "greater than" (">") and the rounded parenthesis (")"). Again, it is clear that the QTC for the two characters are the same.

In each case (FIGS. 12, 13 and 14), however, it will be noted that there are differences in the height/width ratios, and the slopes, of the characters or of parts of them. In the case of FIG. 12 and assuming that the x and y coordinates (with respect to a predetermined datum point) are known for each of the QTC, then the height/width ratio (h/w) of the characters will be given by the Equation:

$$h/w = (y_{Sh} - y_{Fh})/(x_{Fh} - x_{Sv}) \quad (1)$$

while the slope (s) will be given by $$S = (y_{Sh} - y_{Fh})/(x_{Sh} - x_{Fh}) \quad (2)$$

Equations (1) and (2) can be generalised in the form $$R = \sqrt{\frac{[(x_1 - x_2)^2 + (y_1 - y_2)^2]}{[(x_3 - x_4)^2 + (y_3 - y_4)^2]}} \quad (3)$$

It will be seen that Equation (1) and (2) are special cases of Equation (3) where one of the components of each distance of the latter is taken equal to zero.

In applying Equation (3) to distinguish the two characters shown in FIG. 13, various characteristics of the lower concavities of the two characters may be inspected. For example, a first test ($T_1$) may involve the measurement of the ratio of the length of the line M to the length of the line N for each character, the lengths of these lines being determined by means of the x and y co-ordinates of the points $S_v^2$, $C_v^2$ and $S_v^3$. A second test ($T_2$) could involve the measurement of the ratio of the lengths of the lines P and Q for each character, where the lengths of these lines are determined from the x and y co-ordinates of the points $S_v^2$, $C_d^2$, and $S_v^3$.

In applying Equation (3) to distinguish the two characters shown in FIG. 14 a first test, $T_1$, could involve the calculation of the ratio of the horizontal distance between the QTC $S_h$ and $F_v$ to the horizontal distance between the QTC $S_h$ and $S'_v$. A second test, $T_2$, could involve the calculation of the ratio of the vertical distance between the QTC $F_d$ and $F_v$ to the vertical distance between the QTC $S_h$ and $F_h$. Thus, $$T_1 = \frac{X_{Sh} - X_{Fv}}{X_{Sh} - X_{Sv}}, \text{ and}$$

-continued
$$T_2 = \frac{Y_{Fd} - Y_{Fv}}{Y_{Sh} - Y_{Fh}}$$

Thus, by way of example and applying $T_1$ and $T_2$ to the characters as drawn in FIG. 14 and scaling off the drawing,

| | | | |
|---|---|---|---|
| (a) | $T_1 = \frac{4}{1} = 4$ | , for ">", and | |
| | $T_1 = \frac{2}{3}$ | , for ")"; and | |
| (b) | $T_2 = \frac{1}{5}$ | , for ">", and | |
| | $T_2 = \frac{1}{2}$ | , for ")". | |

These terms would therefore enable a clear distinction between the characters ">" and ")".

It will be appreciated that tests may be devised for ambiguities between other characters.

Therefore it is necessary to devise some means for storing the co-ordinates of the QTC for each character in a way which enables these co-ordinates to be easily accessed and then used for carrying out the various tests. This will now be described.

In order to carry out this function, it is necessary for the QTC of each character to be stored in a manner which enables its relative position, in the character, to be known, and it is necessary for this to be achieved in spite of the fact that minor distortions of character can alter the order in which the QTC are read. For example, "3" may be written in a variety of ways; thus either its uppermost or its lowermost strokes may extend most leftwardly and thus be detected first (by the first column of the photocell array). In either case the system must ensure that the QTC of the first recognized part of the character is recognized as relating to the correct part of the character.

In order to carry out this function, the apparatus is provided with a memory (referred to as a matricial memory) comprising a number of registers (each comprising a plurality of storage locations) which are functionally arranged in a predetermined manner.

Figure 15:
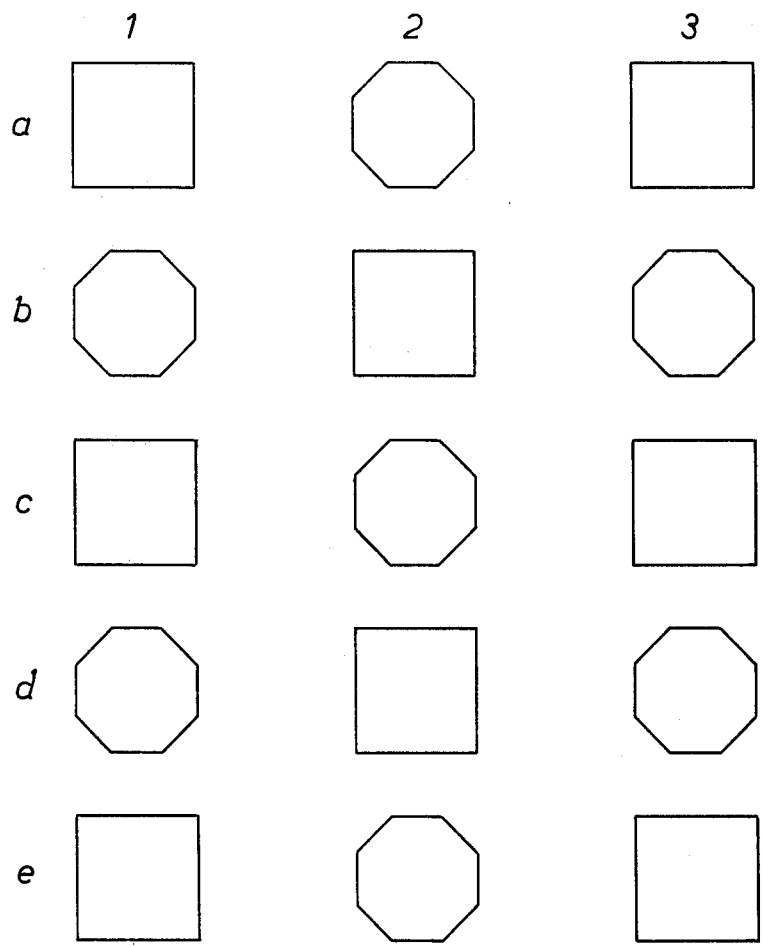
FIG. 15 illustrates a matricial memory used in the system.

As shown in FIG. 15, the matricial memory contains two types of register, a first type of register which is used to store those codes corresponding to concavities of the characters (these registers being illustrated in the Figure as hexagons), and a second type of register for storing the QTC corresponding to convexities of the characters (these registers being illustrated as squares in the Figure). The registers are arranged in alternating fashion as shown in FIG. 15 in a matrix of rows and columns, and the columns and rows are numbered, and lettered, respectively, so as to enable each register to be identified in co-ordinate fashion; thus for example, register 2-a is the convexity-storing register in the second column and first row the matricial memory.

Reference to FIGS. 11a to 11q will show that the following QTC represent shapes relating to concavities or parts thereof:

$O_a$, $O_v$, $O_d$, $C_h$, $C_a$, $C_v$, $C_d$, $O_h$.

In contrast, the following QTC represent shapes relating to convexities or parts thereof:

$S_a$, $S'_v$, $S_v$, $S_d$, $F_h$, $F_v$, $F_a$, $F_d$, $S_h$.

In the manner to be described, as each QTC is read, it is directed to an appropriate register in the matricial memory so that, at the end of the reading process, the relative positions of the registers which actually store QTC are such as to represent the shape of the character at least approximately.

As stated, each register in the matricial memory contains a predetermined number of storage locations—eight such locations for each register representing a concavity and nine for each register representing a convexity. Each storage location in a register is allocated to a particular one of the QTC and becomes activated (that is, switched to a data-storing state) when the appropriate QTC is detected.

Figure 16:
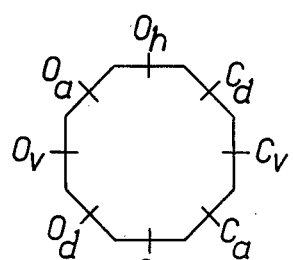
FIGS. 16 and 17 illustrate two different types of register used in the memory of FIG. 15.

FIG. 16 illustrates one of the concavity-storage registers of the matricial memory and diagrammatically illustrates the eight storage locations of the register and indicates which location is allocated to which QTC.

Figure 17:
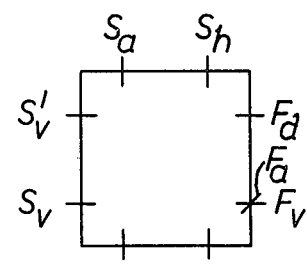

FIG. 17 shows the same for an example of the convexity-storage register.

In order to carry out the QTC-storing process, the system divides each character up into segments (separated by vertical lines), the segments representing character portions which embrace concavities.

Figure 18:
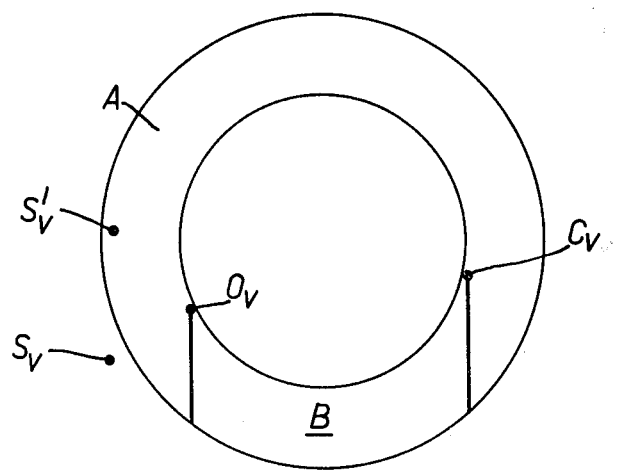
FIGS. 18, 19, 20A and 20B illustrate how characters are split up into segments by the system.
Figure 19:
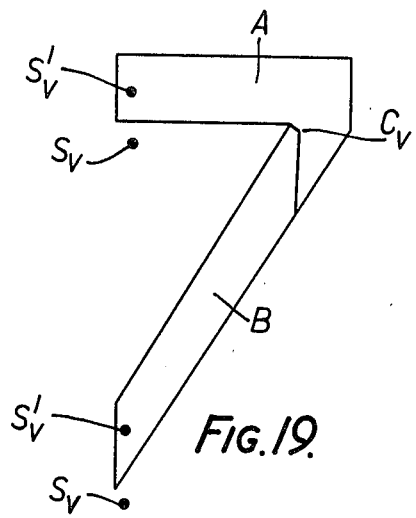

FIGS. 18 and 19 illustrate how a character is split up into such segments.

FIG. 18 illustrates a "0". Detection of the QTC $S'_v$ (followed by the confirming code $S_v$) is recognised by the system as indicating the start of a first segment A. When the code $O_v$ occurs, the system responds by beginning a new segment, segment B. When the code $C_v$ is detected, the convention adopted is that the lower segment B is considered terminated and the upper segment A continues.

FIG. 19 shows the same process applied to the numeral "7". Here, the upper limb of the numeral is detected first and the corresponding code $S'_v$ (followed by the confirming code $S_v$) identifies this as part of a first segment, segment A. When a following vertical scan produces a code $S'_v$ for the lower limb of the numeral (followed by the confirming code $S_v$) a second segment B is identified. When the code $C_v$ occurs, segment B is terminated and segment A continues.

Figure 20A:
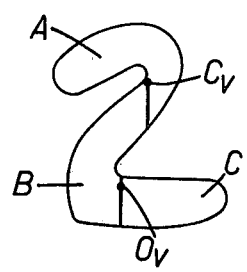
Figure 20B:
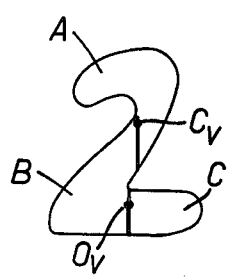

FIGS. 20A and 20B indicate the same process applied to two different representations of the numeral "2". Comparison of FIGS. 20A and 20B shows that in one case it is the lower segment which is detected initially while in the other case it is the upper segment. In the manner to be described, the system ensures that in either of these cases the QTC corresponding to the different segments are correctly positioned in the matricial memory.

As shown in FIGS. 20A and 20B, detection of the code $O_v$ starts a new segment, segment C (in the same manner as indicated in FIG. 18).

FIG. 21 illustrates, as a first example, how the QTC corresponding to the numeral "7" are stored in the matricial memory.

The Figure shows a representation of the numeral and the numbers superimposed on this numeral indicate the order in which the QTC are detected. The actual QTC represented by the numerals are as follows:

TABLE 2

| QTC No. | QTC |
|---|---|
| 1 | $S'_v$ |
| 2 | $S_v$ |
| 3 | $S'_v$ |
| 4 | $S_v$ |
| 5 | $S_a$ |

TABLE 2-continued

| QTC No. | QTC |
|---|---|
| 6 | $S_d$ |
| 7 | $S_d$ |
| 8 | $F_h$ |
| 9 | $F_a$ |
| 10 | $C_v$ |
| 11 | $C_d$ |
| 12 | $S_h$ |
| 13 | $F_d$ |
| 14 | $F_v$ |

The positions in the matricial memory where the QTC are stored are indicated by the small crosses.

As shown, QTC No. 1 is the code $S'_v$ and indicates the start of a segment, segment A. As this is the first segment detected, this code is therefore stored in the appropriate storage location in the register 1-a. QTC No. 2 is the code $S_v$, and this is stored in register 1-a. QTC No. 3 is a second code $S'_v$ and (after confirmation by the following code $S_v$, QTC No. 4) this indicates the start of a separate segment, segment B, and therefore it must be stored in the next available convexity register, register 1-c.

This process continues, with QTC Nos. 5, 6, 7, 8 and 9 being stored as shown.

When QTC No. 10 occurs, that is, the code $C_v$, this indicates termination of the lower segment B. This QTC, and the following QTC, No. 11 (the code $C_d$), are stored in the concavity register (register 1-b) between the registers 1-a and 1-c.

Termination of the segment B ensures that the remaining QTC, Nos. 12, 13 and 14, although still referring to segment A, are stored in a different convexity register, the register 2-b, because termination of segment B indicates that segment A is continuing to the right.

At the end of the scanning process, therefore, registers 1-a, 2-b, and 1-c will be storing data, together with the concavity register 1-b. The letters A and B indicate which segments of the character are stored in the registers.

At the end of the scanning process, it will therefore be apparent that the activated convexity-storage registers are physically located relative to each other in approximately the manner of the numeral "7" and they have been cross-hatched to make this clearer. In the manner to be explained in more detail below, this fact is used as part of the overall recognition process.

Figure 23:
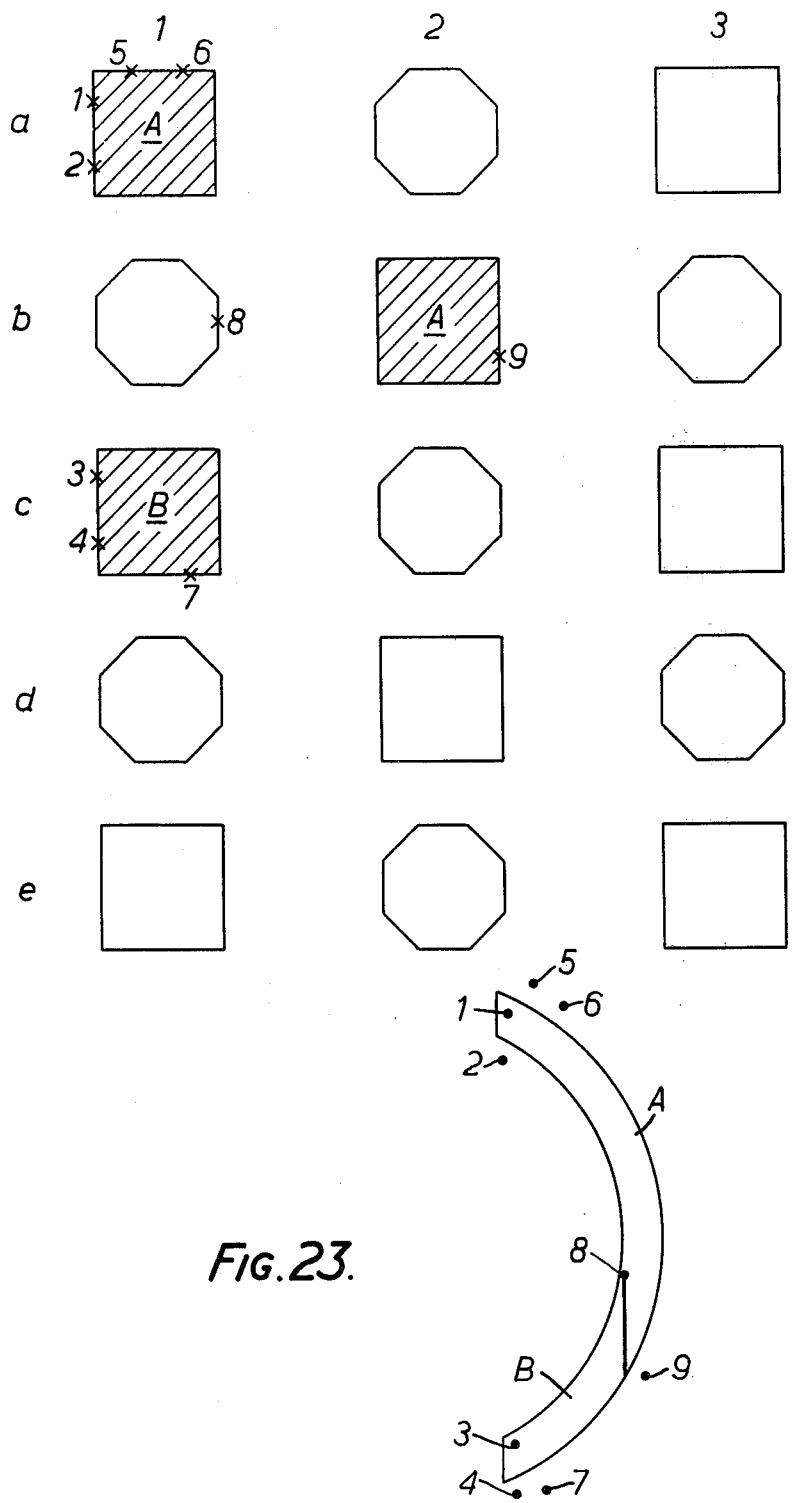

FIGS. 22 and 23 show how the matricial memory stores the characters ">" and ")". For each character, the QTC are the same, and are identified as follows (the numbers referring to those shown in the Figures superimposed on the characters):

TABLE 3

| QTC No. | QTC |
|---|---|
| 1 | $S'_v$ |
| 2 | $S_v$ |
| 3 | $S'_v$ |
| 4 | $S_v$ |
| 5 | $S_a$ |
| 6 | $S_h$ |
| 7 | $F_h$ |
| 8 | $C_v$ |
| 9 | $F_v$ |

Again, the activated convexity-storage registers in FIGS. 22 and 23 are physically located relative to each other in the manner of the two characters.

Each register in the matricial memory has associated with it a corresponding address register (not shown), and each address register has a storage location corresponding to a particular storage location in the associated matricial memory register. When a QTC is stored in the appropriate storage location in one of the registers in the matricial memory, its address (that is, the co-ordinates identifying its position on the matrix of scanning photocells) will automatically be stored in the corresponding location in the address register.

In the examples considered above, the shape of each character, the numeral "7" for example (FIG. 21), was such that its upper segment, segment A, was scanned before its lower segment, segment B, and therefore the QTC of the segments were stored in convexity registers whose relative position was correct (i.e. correctly related according to the shape of the character).

In many cases, the character shape may be such that a lower segment is scanned first and the system must therefore be arranged to detect this, and still ensure that, at the end of the storing process, the segments end up in the correct registers.

For example, the "2" of FIG. 20A is shaped such that its upper segment A will be noted by the scanning process before the lower segment B and the segments will thus be placed initially in the correct convexity registers in the matricial memory.

In the case of the "B" of FIG. 20B, however, its shape is such that the lower segment, segment B, will be detected by the scanning process before the upper segment, segment A. In order to deal with this situation, the system includes a logical arrangement shown in FIGS. 24A and 24B consisting of a first in-first out ("FIFO") store 80 having output registers 82 and 84 and input register 86. In a manner now to be described in connection with FIGS. 24A, 24B and 25 (the latter showing a representation of the matricial memory), the process which takes place in the storing of the QTC representing the "2" of FIG. 20B will be considered.

Figure 24A:
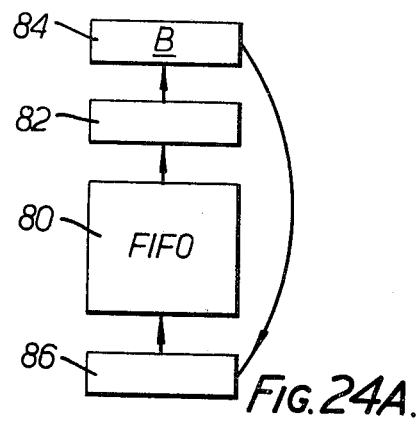
FIGS. 24A and 24B show a logic arrangement for controlling the memory of FIG. 15.
Figure 24B:
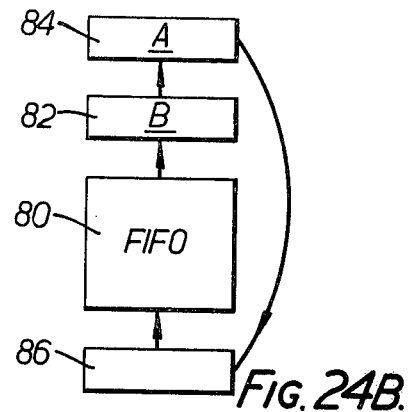

The logic arrangement of FIGS. 24A and 24B is controlled by the QTC themselves, and in particular, by the QTC S'$_v$ and S$_v$.

As the process of scanning the numeral "2" of FIG. 20B starts, segment B will initially be detected and the QTC for this will be placed into the first convexity register, register 1-a (FIG. 25) as shown by the dotted representation of the letter "B". At the same time, a code identifying this segment B will be entered into the FIFO by the input register 86 and will automatically be indexed through the registers 80 and 82 and into the final output register 84 as shown in FIG. 24A.

As the scanning process continues, the first part of the upper segment A will be detected. The upper segment A will be detected by the occurrence of its QTC S'$_v$ and S$_v$, and since the system (having been re-set at the end of each scanning line) will detect these codes before any other QTC in the scanning line, the system will therefore sense that the segment A is above the segment B. A code which identifies segment A will therefore be entered into the FIFO 80 by the input register 86 and will be automatically indexed through the registers 80 and 82 and into the final output register 84, displacing from that register the code representing the segment B; this displaced code is automatically fed back into the register 86 and passes through the FIFO 80 into the register 82. The codes therefore end up in the relative position shown in FIG. 24B, that is, with the code representing segment A in register 84 and therefore above the code representing segment B which ends up in register 82. This downward displacement of the code representing segment B automatically causes the QTC in the register 1-a of the matricial memory to be displaced into the register 1-c, as indicated by the arrow I and will also ensure that the QTC representing the segment A are stored in register 1-a.

The segments are therefore stored in their correct relative positions in the matricial memory.

Figure 25:
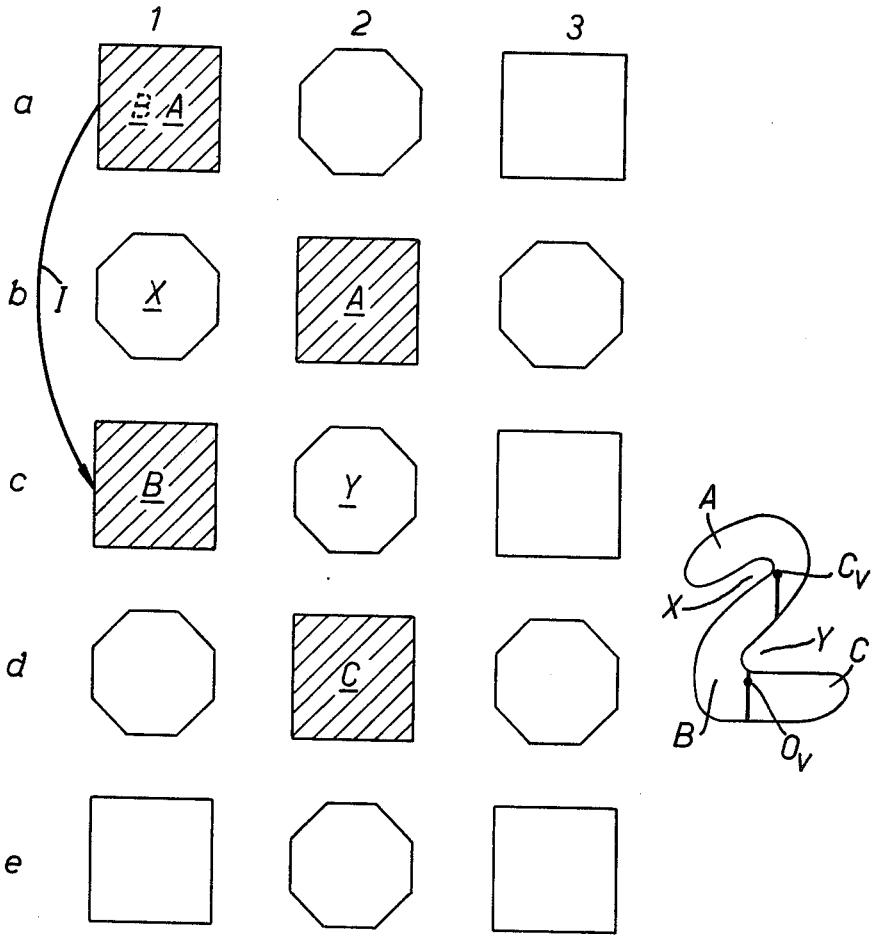
FIG. 25 illustrates how the character shown in FIG. 20B is stored in the memory of FIG. 15.

As the scanning process continues, the code C$_v$ will be detected as shown in FIG. 25, thus indicating an end of the segment B. In the manner explained above in connection with FIG. 4, further QTC for segment A are therefore stored in the next register, register 2-b, to the right because the code C$_v$ indicates that the segment A is continuing to the right.

Similarly, detection of the code O$_v$ indicates the end of the segment B and the beginning of a new segment, segment C, which must be displaced to the right of segment B. The QTC for segment C therefore become stored in register 2-d.

During the above process, it will be appreciated that the QTC for the concavities X and Y (FIG. 25) become stored in the cavity registers 1-b and 2-c, respectively.

At the end of the scanning process, the convexity registers 1-a, 1-c, 2-b, and 2-d, are therefore storing QTC as indicated by the cross-hatched lines, the relative positions in the matricial memory being approximately in the shape of the numeral "2".

When the logic arrangement shown in FIGS. 24A and 24B detects that a shift in QTC data from one convexity register in the matricial memory to another is necessary, in the manner described, it automatically ensures that the address data in the associated address stores is correspondingly shifted.

The foregoing discussion indicates how a logical sequence of binary decisions may be followed through to provide a complete character recognition process.

Initially, the character is read in the manner described and, at the end of the reading process, the character segments are stored, in their appropriate relative positions, in the matricial memory, and the co-ordinate addresses of the QTC are stored in the corresponding address register. In other words, the complete QTC for the character are known together with their relative co-ordinate positions.

The first step in the recognition process consists of inspection of the matricial memory and consideration of the relative positions of the registers which are storing segments. This process will probably not result in complete identification of the character. For example, FIGS. 21 to 23 show that the registers storing segments in the matricial memory in the case of three different characters ("7", ">" and ")") are identical, although the characters are different. However, at the least this part of the recognition sequence will eliminate a large number of possible characters.

The next step in the recognition sequence is to inspect the actual QTC. Even if the actual registers storing character segments in the matricial memory do not enable a distinction to be made between two characters (e.g. "7", ">" and ")"), it may be that the actual QTC (stored in the matricial memory) exclusively identifies one particular character. This will depend to some extent on the range of characters for which the system is adapted to handle, and the larger this range, the less likely it is that the actual identity of the QTC will enable exclusive character recognition. For example symbols ">" and ")" have the same QTC and involve the same convexity registers in the matricial memory. On the other hand, although the characters "7", ">" and ")" involve the same convexity registers in the matricial memory, the QTC of "7" differs slightly from the QTC of ">" and ")" because the latter characters do not have the QTC $C_d$.

The third and final step in the recognition process, for distinguishing between the characters involving the same convexity registers in the matricial memory and also having the same QTC consists in the carrying out of metrical tests such as was described above with reference to FIGS. 12, 13 and 14. The system identifies which particular tests to carry out on the basis of the information obtained from the previous sequences in the recognition process. In other words, by this stage in the recognition process, the system has eliminated most possibilities and knows that the character must be one of a restricted group; and therefore knows which metrical tests to carry out.

In the manner described above with reference to FIGS. 12, 13 and 14, the system therefore selects the appropriate QTC, in accordance with the particular metrical test or tests to be carried out, extracts their co-ordinates from the address registers and then performs the necessary calculations to carry out the test or tests. This enables the character to be finally recognised.

Other forms of scan can be used (instead of the scans described consisting of two perpendicular and two oblique scans). For example, three scans, mutually displaced by 120°, can be used.

What I claim is:

1. A method of character identification, comprising the steps of
    forming on a predetermined area a representation of the character to be identified,
    subjecting the area to a plurality of frame scans, the scans comprising at least three scans of respectively different directions,
    detecting during each scan whether or not each element of the said area includes part of the character representation,
    producing in response to each said scan either no code or one or more of the following codes in dependence on the shape of the character representation, namely codes respectively representing a START, a FINISH, an OPENING and a CLOSING of the character representation,
    monitoring the said codes to divide the character representation into segments thereof each of which at least partially embraces a concavity thereof,
    storing those codes of each segment which relate to convexity-shapes in a part of storage means which is identified with that segment,
    storing those codes of each segment which relate to concavity-shapes in a part of the storage means which is identified with that segment and is different from the said part which is identified with the same segment but is for storing those codes relating to convexity-shapes thereof,
    initiating a first recognition process by comparing the relative positions in the storage means of the said parts of the storage means storing the said codes, whereby at least partially to identify the character representation,
    initiating a second recognition process in dependence on the results of the first recognition process by comparing the identities of all the codes produced for the character representation with a predetermined set of groups of the codes, each group relating to a different one of a predetermined series of characters of predetermined shape and consisting of a list of the said codes corresponding to that character, whereby at least partially to identify the character representation,
    storing the coordinate positions of the said codes in relation to a datum fixed relative to the said area, and
    initiating a third recognition process in dependence on the results of the second recognition process by comparing the distance between selected pairs of the said codes by comparing the coordinates of the pairs of codes, whereby at least partially to identify the said character representation.

2. A method according to claim 1, in which those codes, relating to convexity-shapes, of the two regions of a particular segment which respectively lie on opposite sides of a junction line between that segment and another segment (or on opposite sides of a rectilinear extension of that line) are stored in different parts of the storage means, both of which are identified with the said particular segment.

3. A method according to claim 1, including the steps of
    detecting the beginning of a segment by the detection of either a START or an OPENING code during a particular one of the frame scans, and
    detecting the end of a segment by the detection of a CLOSING or a FINISH code during the same frame scan.

4. A method according to claim 1, in which there are four scans, the directions of two of the scans being perpendicular to each other and the directions of the other two being oblique to the first two and perpendicular to each other.

5. A method according to claim 1, in which there are three scans, their directions being mutually spaced by 120°.

6. Apparatus for character identification, comprising
    means for subjecting a representation of the character to be identified, and an area surrounding said representation, to a plurality of frame scans, the scans comprising at least three scans of respectively different directions,
    detecting means operative during each scan to detect whether or not the scanning means scans part of the character representation whereby to produce, for each scan, no code or one or more of the following codes in dependence on the shape of the character representation, namely codes respectively representing a START, a FINISH, an OPENING and a CLOSING of the character representation,
    means for monitoring the said codes to divide the character representation into segments thereof each of which at least partially embraces a concavity thereof,
    code storage means, connected to store the codes produced by the detecting means, means for storing those codes of each segment which relate to convexity-shapes in a part of the storage means which is identified with that segment, means for storing those codes of each segment which relate to concavity-shapes in a part of the storage means which is identified with that segment and is different from the said part which is identified with the same segment but is for storing those codes relating to convexity-shapes thereof, first recognition means for comparing the relative positions in the storage means of the parts of the storage means storing the codes whereby at least partially to identify the character representation, means for storing a predetermined set of groups of the codes, each group relating to a different one of a predetermined set of characters of predetermined shape and consisting of a list of the said codes corresponding to that character, second recognition means operative when activated to compare the identities of all the codes produced by the detecting means with the predetermined set of groups of the codes, whereby at least partially to identify the character, means responsive to the scanning means and the detecting means for storing in the code storage means for each code stored therein and produced by the detecting means the coordinate position of that code in relation to a datum fixed relative to the representation of the character, and third recognition means operative when activated to compare the stored coordinate positions of selected pairs of said codes whereby to compare the distances between the selected pairs of codes and at least partially to identify the character representation.

7. Apparatus according to claim 6, including means for storing those codes, relating to convexity-shapes, of the two regions of a particular segment which respectively lie on opposite sides of a junction line between that segment and another segment (or on opposite sides of a rectilinear extension of that line) in different parts of the storage means, both of which are identified to the said particular segment.

8. Apparatus according to claim 6, in which the means for monitoring the codes to divide the character representation into segments comprises means for detecting the beginning of a segment by detecting either a START or an OPENING code during a particular one of the frame scans, and means for detecting the end of a segment by detecting a CLOSING or a FINISH code during the same frame scan.

9. Apparatus according to claim 6, in which there are four scans, the directions of two of the scans being perpendicular to each other and the directions of the other two being oblique to the first two and perpendicular to each other.

10. Apparatus according to claim 6, in which there are three scans, their directions being mutually spaced by 120°.

11. Apparatus according to claim 6, including activating means connected to the second recognition means to activate the second recognition means when the first recognition means identifies the character representation as representing more than one character.

12. Apparatus according to claim 11, including activating means connected to the third recognition means for activating the third recognition means when the second recognition means identifies the character representation as representing more than one of the predetermined set of characters.

13. Apparatus for the analysis and recognition of characters, comprising scanning means for individually scanning a representation of each character and an area surrounding the representation, the scans comprising at least three scans of respectively different directions, detecting means operative during each scan to detect whether or not the scanning means scans during each scan a quasi-topological event, first storage means organized in a matrix of registers, means for activating part of those registers when quasi-topological events corresponding to individual convexities of the character representation are detected and for activating another part of those registers when quasi-topological events corresponding to individual concavities of the character representation are detected, means for storing in the activated parts of those registers data corresponding to the detected events, the storage means determining the addresses of the locations in those registers where the said data is stored according to the relative positions at which said events are detected in the character representation, second storage means containing storage registers respectively associated with each item of data in the first storage means, means for storing in the second storage means the coordinates relative to a fixed origin of the positions in the character representation at which the said quasi-topological events are detected, first recognition means operative to analyse the shape of the character representation in terms of the relative positions of the detected convexities and concavities, as represented by the relative positions of the stored items of data, the first recognition means producing an output identifying the representation as representing a particular one or a first plurality of particular ones of a predetermined set of characters, second recognition means operative when activated to analyse the particular types of quasi-topological events stored in the said parts of the registers of the first storage means, the second recognition means producing an output identifying the character representation as representing a particular one or a second plurality of particular ones of the first plurality of particular ones of the predetermined set of characters, third recognition means operative when activated to compare the coordinates stored in the second storage means and relating to at least two selected quasi-topological events, whereby to compare the relative positions of the selected events in the representation, and thereby to produce an output identifying the character representation as representing a particular one of the characters in the said predetermined set, and means for selecting the said two quasi-topological events in dependence on the output of the second recognition means.

14. Apparatus according to claim 13, in which the third recognition means compares the coordinates of at least three selected quasi-topological events whereby to determine the ratio of the distances between at least three quasi-topological events.

15. Apparatus according to claim 13, including control means for shifting the said items of data within the first storage means in dependence on the scanning means, whereby to maintain correspondence between the addresses of the items of data and the relative positions at which the corresponding quasi-topological events are detected in the character representation.

16. Apparatus according to claim 13, in which there are four scans, the directions of two of the scans being perpendicular to each other and the directions of the other two being oblique to the first two and perpendicular to each other.

17. Apparatus according to claim 13, in which there are three scans, their directions being mutually spaced by 120°.

18. Apparatus according to claim 13, including activating means connected to the second recognition means to activate the second recognition means when the first recognition means identifies the character representation as representing more than one character.

19. Apparatus according to claim 13, including activating means connected to the third recognition means for activating the third recognition means when the second recognition means identifies the character representation as representing more than one of the predetermined set of characters.

* * * * *